United States Patent
Naganawa et al.

(10) Patent No.: US 7,825,562 B2
(45) Date of Patent: Nov. 2, 2010

(54) ROTARY ELECTRIC MACHINE, CRANK-SHAPED CONTINUOUSLY WINDING COIL, DISTRIBUTION WINDING STATOR AND FORMING METHOD THEREOF

(75) Inventors: Takashi Naganawa, Kasumigaura (JP);
Takashi Ishigami, Hitachinaka (JP);
Hiromichi Hiramatsu, Yokohama (JP);
Kenichi Nakayama, Hitachinaka (JP);
Tsuyoshi Goto, Hitachinaka (JP);
Yoshimi Mori, Mito (JP); Tomohiro Adachi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 368 days.

(21) Appl. No.: 11/874,291

(22) Filed: Oct. 18, 2007

(65) Prior Publication Data
US 2008/0093948 A1    Apr. 24, 2008

(30) Foreign Application Priority Data
Oct. 19, 2006  (JP) ............................ 2006-284780

(51) Int. Cl.
*H02K 3/04* (2006.01)
(52) U.S. Cl. ............................ 310/208; 310/184
(58) Field of Classification Search .................. 310/45, 310/179, 184, 203, 208, 198
See application file for complete search history.

(56) References Cited

U.S. PATENT DOCUMENTS

| | | | | |
|---|---|---|---|---|
| 3,453,468 A | * | 7/1969 | Lund | 310/180 |
| 3,914,860 A | * | 10/1975 | Schuler | 29/596 |
| 4,405,553 A | * | 9/1983 | Lovgren et al. | 264/272.19 |
| 4,833,356 A | * | 5/1989 | Bansal et al. | 310/207 |
| 4,857,787 A | * | 8/1989 | Taji et al. | 310/180 |
| 5,619,787 A | * | 4/1997 | Couture et al. | 29/596 |
| 5,714,824 A | * | 2/1998 | Couture et al. | 310/208 |
| 6,313,556 B1 | * | 11/2001 | Dombrovski et al. | 310/91 |
| 2010/0001609 A1 | * | 1/2010 | Ishigami et al. | 310/202 |

FOREIGN PATENT DOCUMENTS

| | | |
|---|---|---|
| JP | 04-168955 | 6/1992 |
| JP | 06-284651 | 7/1994 |
| JP | 06-284651 | 10/1994 |
| JP | 08-298756 | 11/1996 |
| JP | 10-066314 | 3/1998 |
| JP | 10-507057 | 7/1998 |
| JP | 2003-143818 | 5/2003 |
| JP | 2004-229459 | 8/2004 |
| WO | WO 96/00460 | 1/1996 |

* cited by examiner

*Primary Examiner*—Thanh Lam
(74) *Attorney, Agent, or Firm*—Antonelli, Terry, Stout & Kraus, LLP.

(57) ABSTRACT

In a distribution winding stator using a coil for a rectangular conductor, a coil end is made smaller than before, and the reduction in the current density is aimed, so that a rotary electric machine of a small size and a high power output is obtained. A conductive wire of a rectangular shape in cross section is double-wound, and is allowed to be shifted by the whole width of the wire having double-wound the crowns of both ends, and is formed to crank shape so as to become a length within the range of the intervals of the adjacent slots, so that the conductive wire is formed by being inserted into the slot of the stator.

15 Claims, 12 Drawing Sheets

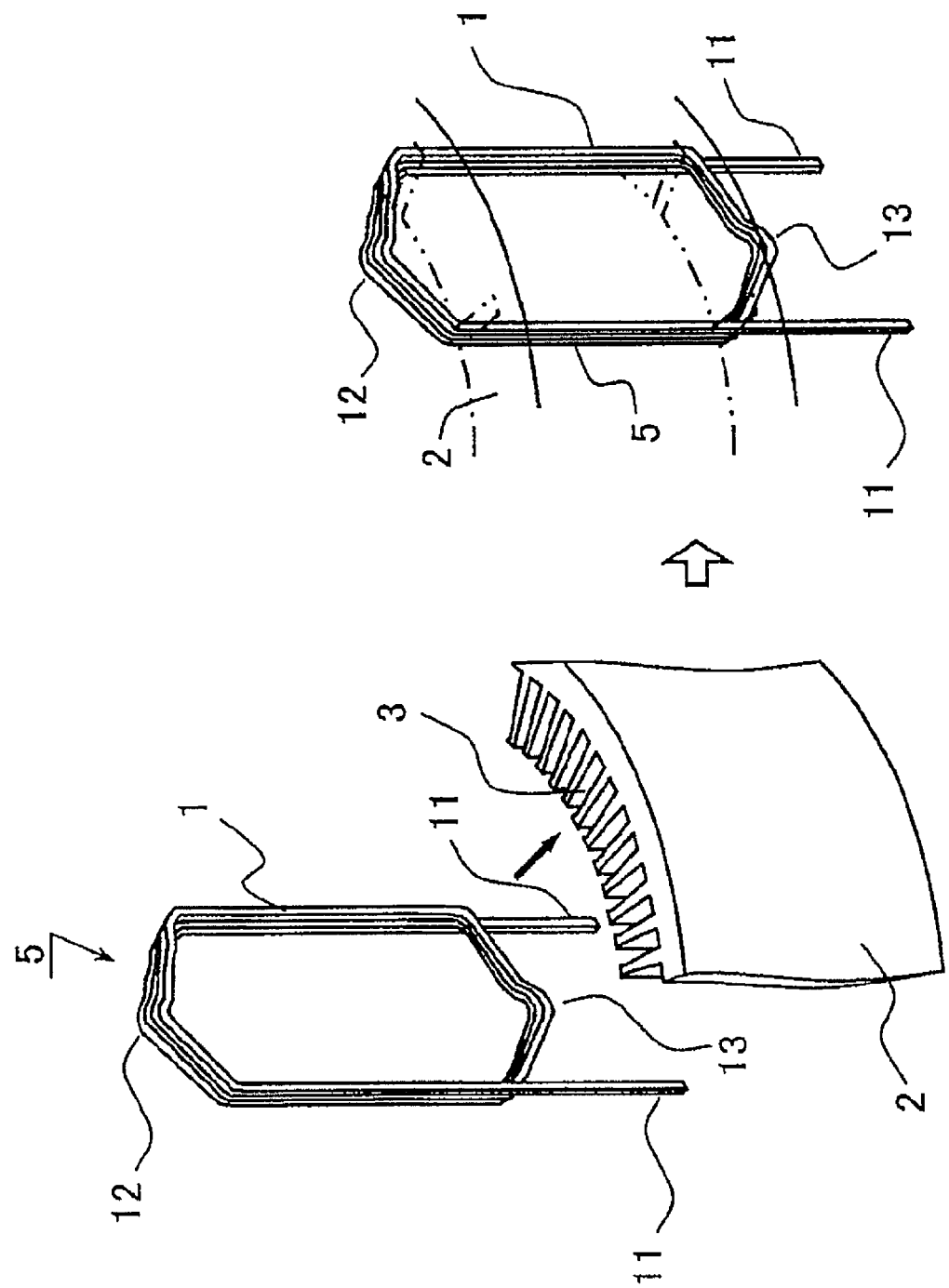

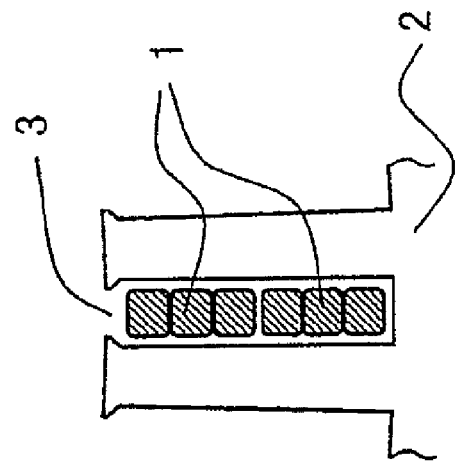
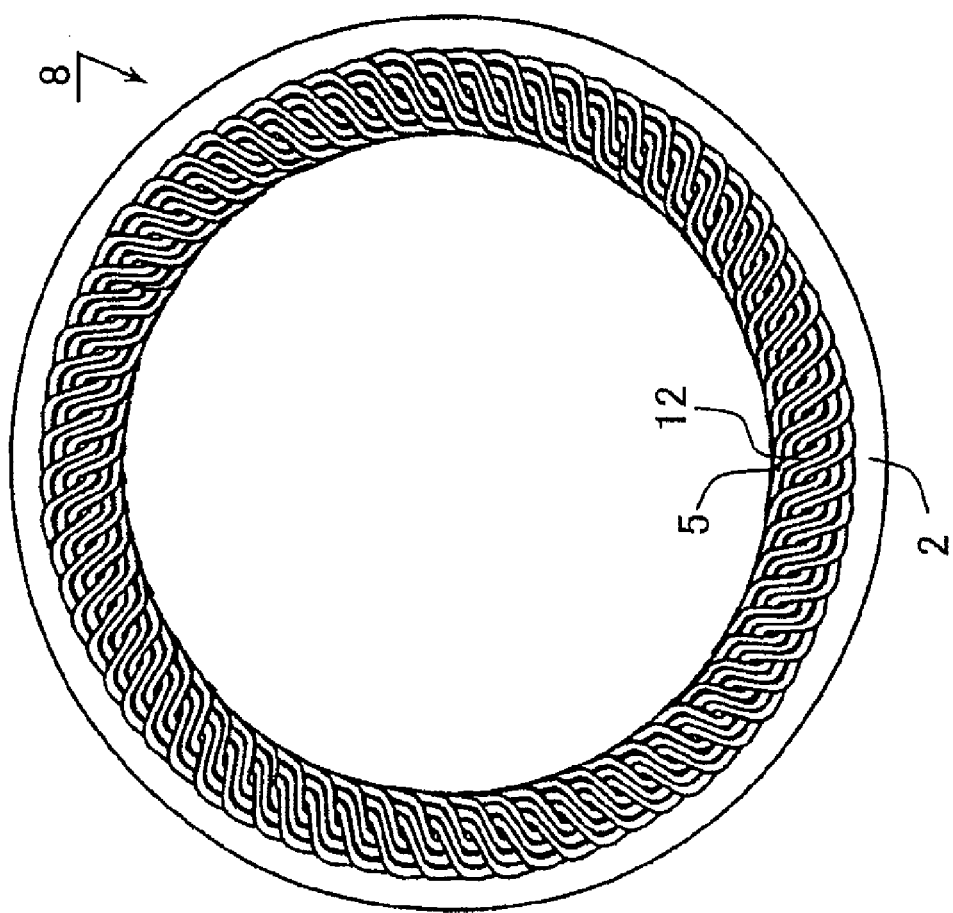
FIG.2B
FIG.2A

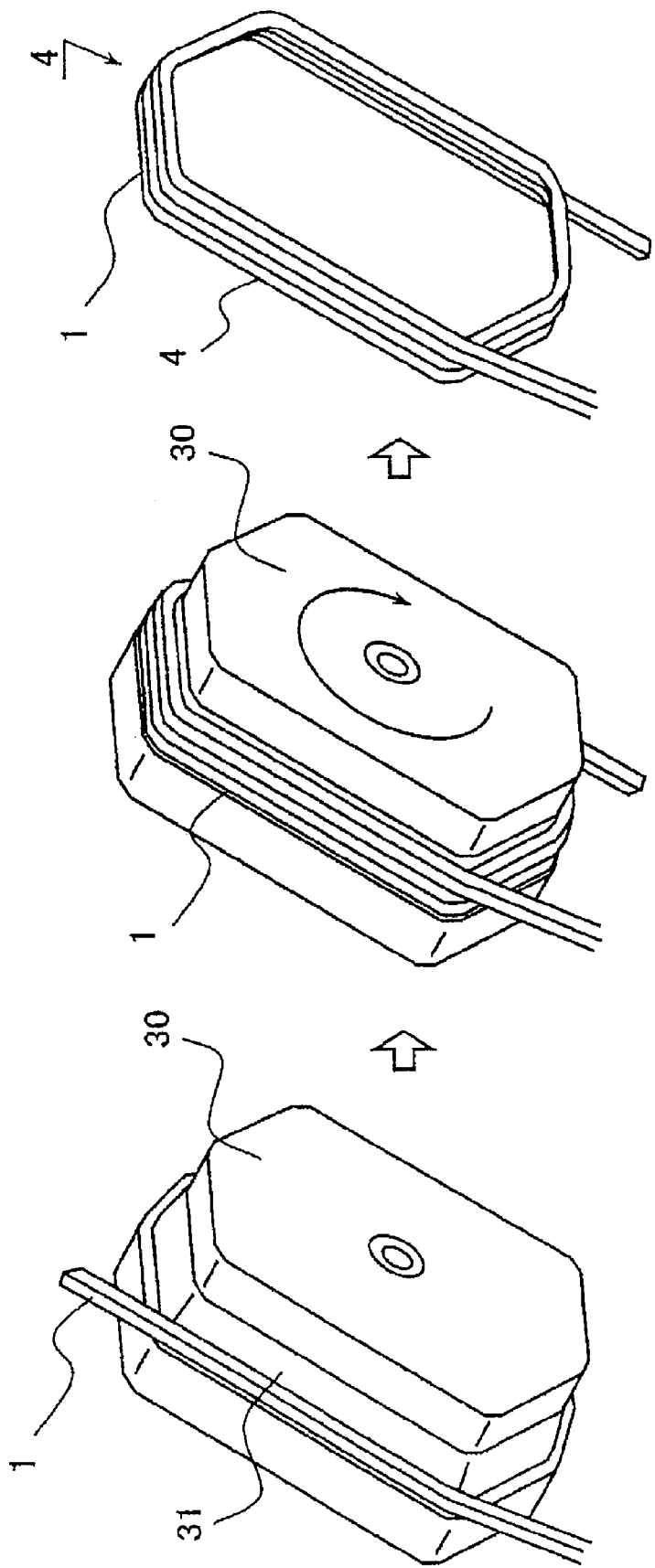

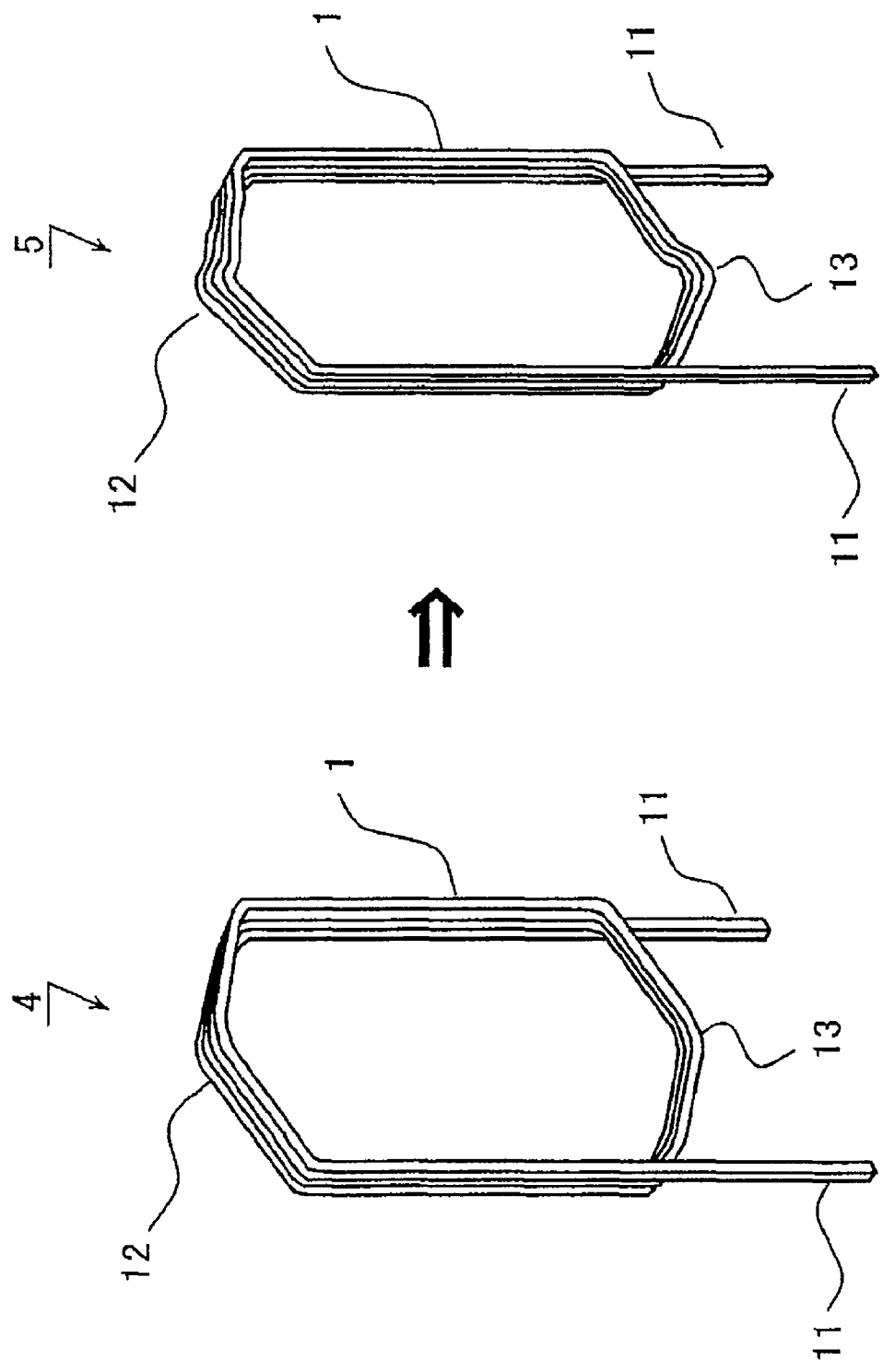

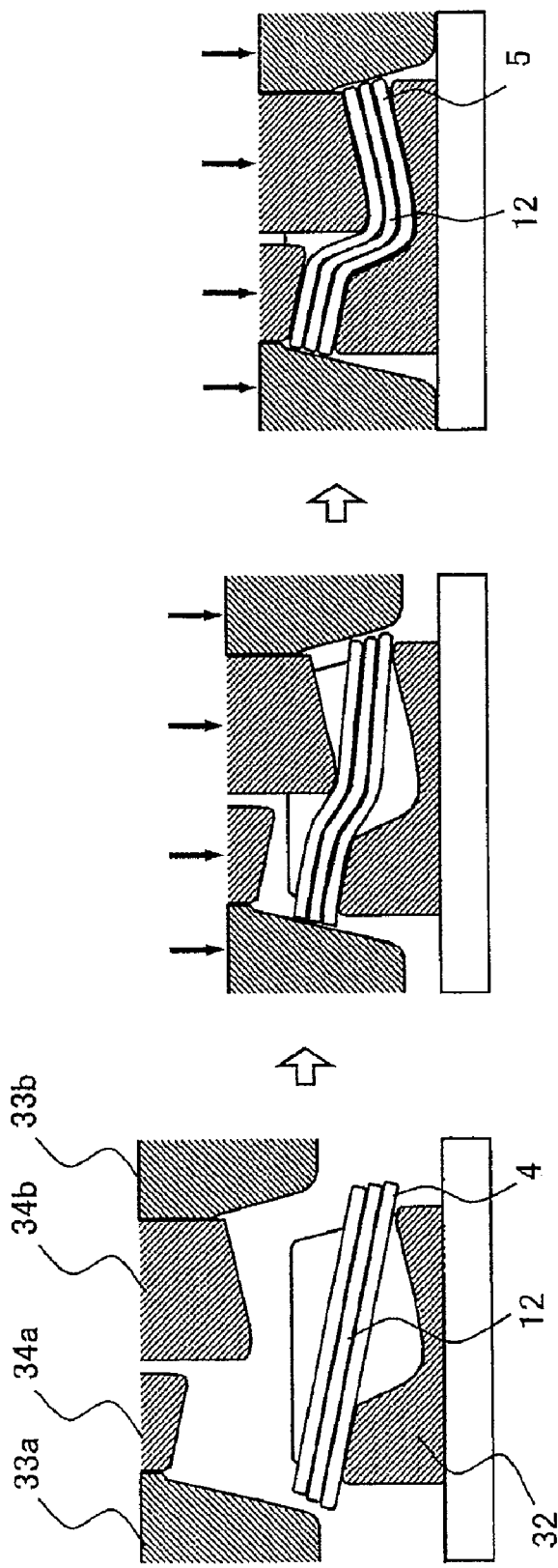

ROTARY ELECTRIC MACHINE, CRANK-SHAPED CONTINUOUSLY WINDING COIL, DISTRIBUTION WINDING STATOR AND FORMING METHOD THEREOF

The present application is based on and claims priority of Japanese patent application No. 2006-284780 filed on Oct. 19, 2006, the entire contents of which are hereby incorporated by reference.

BACKGROUND OF THE INVENTION

1. Field of the Invention

The present invention relates to a rotary electric machine such as a motor and an electric generator, a crank-shaped continuously winding coil, a distribution winding stator and the forming method thereof.

2. Description of the Related Art

A form of a coil winding of a stator includes a concentrated winding to concentratedly wind a coil on each pole cog and a distribution winding to wind a coil by striding across a plurality of slots with hetero-phase coils or in-phase coils mutually overlapped at a coil end. The stator of the concentrated winding can make the coil end small, and is effective for miniaturization and high efficiency of the rotary electric machine. On the other hand, the stator of the distribution winding can cause a rotating magnetic field of the inner periphery of the stator to be closer to a sine wave, and has an output higher than the concentrated winding, and can reduce a noise. Further, in common with both windings, there is a method in which, as one of the means of achieving a high power output, a wire of rectangular cross section is used for the copper wire of the coil, thereby increasing a coil space factor inside the stator slot. The present invention targets at the rotary electric machine of the distribution winding in which the stator coil comprises the rectangular cross section wiring.

Japanese Patent Laid-Open Publication No. 4-168955 (Patent Document 1) discloses a configuration in which a flat square shaped rectangular conductor is bent and shaped so that the surface of a long-side side is opposed to the surface in the radial direction of the stator slot, and this conductor is inserted into a slot from the end face in the axial direction of the stator core, and is electrically connected to an open end portion of the rectangular conductor segment protruded from the inverse side end face of the stator core, thereby forming the electric circuit of a wave winding. This rectangular conductor has a roughly U-shaped form, and the surfaces of the short-side side of the flat square shaped cross-section are in the same direction.

Further, Japanese Patent Laid-Open Publication No. 6-284651 (Patent Document 2) discloses that the rectangular conductors having the same or nearly the same horizontal and vertical size are used by bundling four pieces. The conductor bundling four pieces have a roughly pine-needle shape, and the surfaces of the conductor opposing to the surface in the radial direction of the slot are in the same direction.

Further, Japanese Patent Laid-Open Publication No. 8-298756 (Patent Document 3) discloses a coil referred to as a "formed coil" used in the middle sized and large sized rotary electric machines, in which a flat square wire having a self-welding layer is wound in an oval shape, and its entirety is made hard, and after that, the coil end is twisted and deformed, thereby forming a non-interacting shape of the coil end. Each conductor comprising the coil lines up in the same direction inside the slot and at the coil end, and is in a state mutually firmly fixed and adhered.

Further, Japanese Patent Laid-Open Publication No. 10-66314 (Patent Document 4) discloses the stator winding of the distribution winding coil system in which a winding coil wound with a rectangular conductive wire for plural times and formed into a coil shape is inserted into the slot so as to stride across the predetermined slot.

In these Prior Arts, in the distribution winding stator, the stator using the flat type rectangular conductor has the conductors disposed in a small division number in the radial direction inside the stator slot, and the stator using the rectangular conductors having the same or nearly the same vertical and horizontal size has a structure in which the crown of the conductor forming the coil end is protruded.

SUMMARY OF THE INVENTION

The problems to be solved by the present invention is to invent the form of a coil and its forming method to obtain a rotary electric machine having a high power output in a distribution winding stator and aiming at miniaturization and high efficiency.

With respect to the high power output, since the output of the rotary machine is approximately decided by the number of slots of the stator core and the shape thereof as well as the occupied area of the conductor occupying the inside of the slot, the increase in the space factor of the conductor inside the slot is the problem to be solved by the present invention.

With respect to the miniaturization, since the size of the stator core is fixed, making the coil ends of the stator core both ends small to meet the size of the distribution winding stator is the problem for the miniaturization of the rotary electric machine. The conductor disclosed in Japanese Patent Laid-Open Publication No. 6-284651 (Patent Document 2) is a segment coil (divided coil) type bundling four pieces, and four pieces of the rectangular conductors which are coil wires are roughly bent in a pine needle shape. With the bent crown as a point of support, the rectangular conductors are opened frontward and backward. Hence, a height of the portion equivalent to the whole width of the bundled conductors is required at the very least. Further, the conductor disclosed in Japanese Patent Laid-Open Publication No. 8-298756 (Patent Document 3) is a formed coil type of an oval shape double winding the flat square wires, and is opened frontward and backward with the crowns of the bent both ends as supports. Hence, a height of the portion equivalent to the long side of the flat square wire is required at the very least. To review the bent formation method of these conductors and to obtain the formed coil type with the crown made low are the problems to be solved by the present invention.

With respect to the high efficiency, the reduction in the current density and the reduction in the copper loss can be cited. The conductor disclosed in Japanese Patent Laid-Open Publication No. 4-168955 (Patent Document 1) is a segment coil (divided type) roughly bending the flat square wire in the U-shaped form, and has a structure in which two pieces of the conductors are disposed in the radial direction inside one slot. To aim at the reduction in the current density by having a structure in which the conductor disposed inside the slot is finely divided in the radial direction is the problem to be solved by the present invention.

Further, the conductor disclosed in Japanese Patent Laid-Open Publication No. 6-284651 (Patent Document 2) is a segment coil bounding four pieces, resulting in the structure in which four terminal wires at one side are connected by welding and the like. To aim at the reduction in copper loss by having a structure in which the number of connecting points is reduced is the problem to be solved by the present invention.

The form of a coil and its formation method to solve the above described three problems are of importance, and an object of the present invention is to obtain the form of the coil and its formation method to obtain a rotary electric machine having a high power output and aiming at miniaturization and high efficiency in the distribution winding stator.

The feature of the rotary electric machine of the present invention is such that the winding coil is formed with a crank-shaped portion without being accompanied with twisting on rough crown portions of both ends in the rotary electric machine comprising a multiple stator winding configured by storing inside a slot of the stator core a winding coil wound with a rectangular conductive wire having an insulating coated layer for plural times and formed into a coil shape.

By the present invention, the distribution winding stator using the coil which winds a conductor of the rectangular cross section by a lap winding is structured such that the coil end is made smaller than before, and the conductor is split and disposed in the radial direction inside the slot. As a result, by bringing the advantages of the distribution winding stator excellent in rotary characteristics into play, the miniaturization and high efficiency of a rotary electric machine of a high power output can be realized.

BRIEF DESCRIPTION OF THE DRAWINGS

FIG. 1 is an explanatory drawing of a formed coil of a first embodiment of the present invention;

FIG. 2 is an explanatory drawing of a distribution winding stator of the first embodiment of the present invention;

FIG. 3 is an explanatory drawing of a continuously winding step in the formation process of the formed coil of the first embodiment of the present invention;

FIG. 4 is an oblique view of a winding coil and the formed coil in the formation process of the first embodiment of the present invention;

FIG. 5 is an explanatory drawing of the deformation process to shape from the winding coil to the formed coil of the first embodiment of the present invention;

DETAILED DESCRIPTION OF THE PREFERRED EMBODIMENTS

Figure 6:
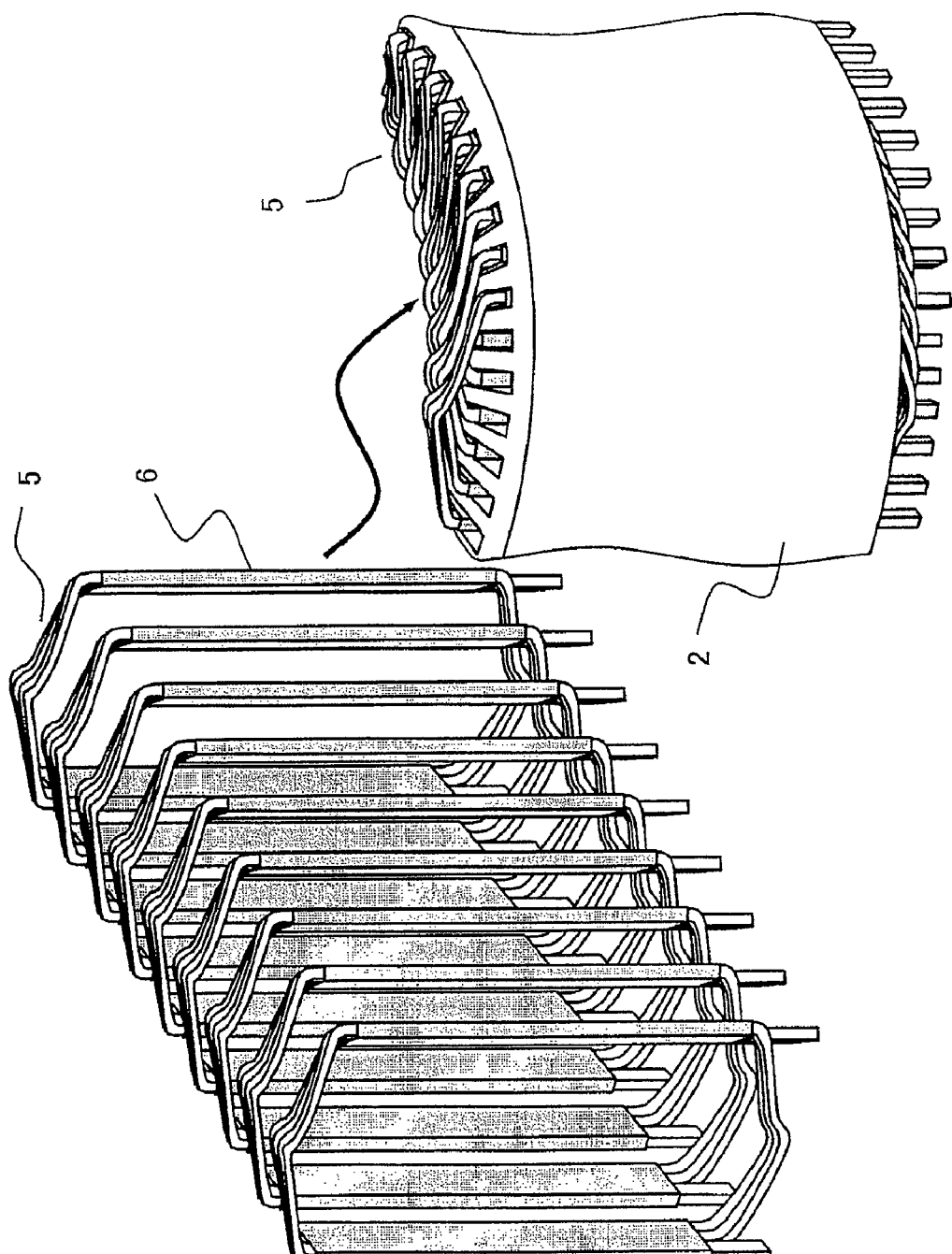
FIG. 6 is an oblique view of a state in which the formed coil being the first embodiment of the present invention is fitted into a stator slot.

Embodiments of the present invention will be described below by using the drawings.

First Embodiment

FIG. 1 shows a structure of a formed coil type of a first embodiment of the present invention. FIG. 1A is an oblique view prior to fitting of a formed coil 5 to a stator core 2, and the stator core 2 is shown notched. FIG. 1B is an oblique view showing a state in which the formed coil 5 is fitted to the stator core 2, and the outline of the stator core 2 is shown in a two-dot broken line. A coil wire 1 is a square wire made of copper and covered with a thin film of enamel resin. The stator core 2 is made of a rolled plate of approximately 1 mm in thickness which is punched out and laminated. The coil wire 1 of the square wire of the same size or nearly the same size in length of two sides is continuously wound (three turns in FIG. 3), and a crown 12 which is an edgewise surface of the coil wire 1 double-wound and a coil terminal portion side crown 13 are bent and shaped in a crank shape so as to form a formed coil 5. The formed coil 5 is inserted into the stator slot 3 from the inside of the stator core 2.

In FIG. 2 is shown a view of a state in which the formed coil 5 of the first embodiment of the present invention is fitted to the stator core 2. The rotary electric machine of the present invention comprises a total of 72 pieces of the formed coil 5 consisting of three phase coils of a U phase, a V phase, and a W phase with each phase in 24 pieces, and the corresponding stator core 2 having 72 pieces of the slot. FIG. 2A shows a top plan view of a distribution winding stator 8 seen from the crown 12 side in a state in which the formed coil 5 is fitted to the stator core 2. The formed coil 5 is not restricted to the insertion position of the slot, but has the same form for all the slots. The crown 12 is in the shape of a crank so that all the formed coils 5 can be fitted to the slots. Although a description will be made in the explanation of FIGS. 10 and 11, the end portion of the coil wire 1 is connected to the end portion of the coil wire 1 of the same phase by welding so that a three phase coil of the U phase, the V phase, and the W phase is formed, thereby obtaining the distribution winding stator 8.

FIG. 2B shows an enlarged cross-section of a portion of the stator slot 3 in a state in which the formed coil 5 is fitted to the stator core 2. If a total cross-section area of the coil wire 1 inside the stator slot 3 is the same, the greater the number of wirings is, the higher the flux density is. In the present invention, the coil wire 1 is a square wire, and is configured to be disposed with two pairs of three turns of the square wires in the axial direction inside the stator slot 3 of the stator core 2, and disposed with six pieces of the conductors of the square wires in the axial direction inside one slot. As a result, rather than two pieces of the flat square wire conductors being disposed in the axial direction inside one slot, six pieces of the square wire conductors being disposed makes the flux density higher, so that the current density is reduced and the efficiency as the rotary electric machine is improved.

The shaping method of the formed coil of the present invention will be described by using FIGS. 3 to 5.

FIG. 3 shows a step of a continuous winding of the square wire 1 by a coil winding machine. FIG. 3A shows an oblique view in a state in which the square wire 1 is set to a bobbin 30.

FIG. 3B shows an oblique view in a state in which the square wire 1 is wound around the bobbin 30. FIG. 3C shows an oblique view of the winding coil 4 taken out from the bobbin 30.

First, as shown in FIG. 3A, the square wire 1 is set to the bobbin 30 having a taper 31 given the predetermined tape angle. Next, as shown in FIG. 3B, the bobbin 30 is rotated while giving a tensile force to the square wire 1, and the square wire 1 is wound around the bobbin 30, and when wound for the predetermined number of turns (three turns in the present invention), the square wire 1 continuously wound is taken out from the bobbin 30, and a winding coil 4 transferred with the taper angle of the taper 31 of the bobbin as shown in FIG. 3C is obtained.

In the present invention, the taper angle required by the formed coil 5 is shaped at the stage of the winding coil 4. The number of slots of the stator core of the present invention is 72 pieces, and the slot into which one piece of the formed coil enters extends over seven pieces. As a result, the angle by which the formed coil enters inside the slot was taken as 7/72 of 360 degrees to 35 degrees. Consequently, the taper angle of the taper 31 of the bobbin 30 was taken as 17.5 degrees which are half the angle determined as described above. When the taper angle is large, a compression stress is loaded on the wire at the core outer peripheral side of the formed coil, and a tensile stress on the wire at the core inner peripheral side. Further, when the taper angle is small, the tensile stress is loaded on the wire of the core outer peripheral side of the formed coil, and a compression stress on the wire of the core inner peripheral side. When a compression stress is loaded on the wire, a buckling distortion is generated in order to alleviate this stress, thereby raising concern about the size of the formed coil becoming large. On the other hand, when a tensile stress is loaded on the wire, since there is no stress release due to deformation, the tensile stress is always loaded on the wire, and therefore, depending on a long period of the driving circumstances of the rotary electric machine, the wire is at a risk of being broken. The range of the taper angle of the taper 31 in the first embodiment of the present invention is preferably 15 degrees to 20 degrees.

FIG. 4 is a comparison view of rough shapes of the wiring coil 4 and the formed coil 5 formed in the form to be inserted into the slot of the stator. The formed coil 5, as shown in FIG. 2A, is shaped in the form to be fitted to the stator core 2. For this reason, it is necessary that the crown 12 and the terminal portion side crown 13 are bent in a crank shape in the edgewise surface of the coil wire 1 so as to shape the formed coil 5.

FIG. 5 is a top plan view of a mold showing a deformation process from the winding coil 4 to the formed coil 5 and the winding coil 4 or the formed coil 5 seen from the crown 12 side. FIG. 5A shows a state in which the winding coil 4 is set to a bottom mold 32, FIG. 5B a state in which side molds 33a and 33b and upper molds 34a and 34b are halfway through coming down, and FIG. 5C a state in which the side molds 33a and 33b, and the upper molds 34a and 34b have come down to the predetermined positions.

The bottom mold 32, the side molds 33a and 33b, and the upper molds 34a and 34b are made of steel, and are hard molds increased in hardness by thermal refining, and to prevent an injury of the enamel coated layer by shaping, a mirror finishing is given to the surfaces contacted by the coil wire 1. As shown in FIGS. 5A to 5C, after setting the wiring coil 4 to the bottom mold 32, the side molds 33a and 33b and the upper molds 34a and 34b are allowed to come down up to the predetermined positions, thereby shaping the formed coil 5.

FIG. 6 shows an oblique view of a state in which the formed coil 5 is fitted into the stator slot of the stator core 2. For ease of explanation, the case is shown, in which the number of formed coils 5 is nine pieces. First, the straight line portion of the formed coil 5, which is equivalent to a position inserted inside the stator slot of the stator core 2, is covered with an insulating sheet 6. The reason why the straight portion is covered by the insulating sheet 6 is because both purposes of taking an insulating measure for the possible existence of pin holes in the enamel coated layer of the coil wire 1 and preventing an injury of the enamel coated layer at the fitting time into the stator core are to be met.

Next, the formed coil 5 attached with the insulating sheet 6 is inserted into the stator slot in sequence from the inner side of the stator core 2.

Figure 7:
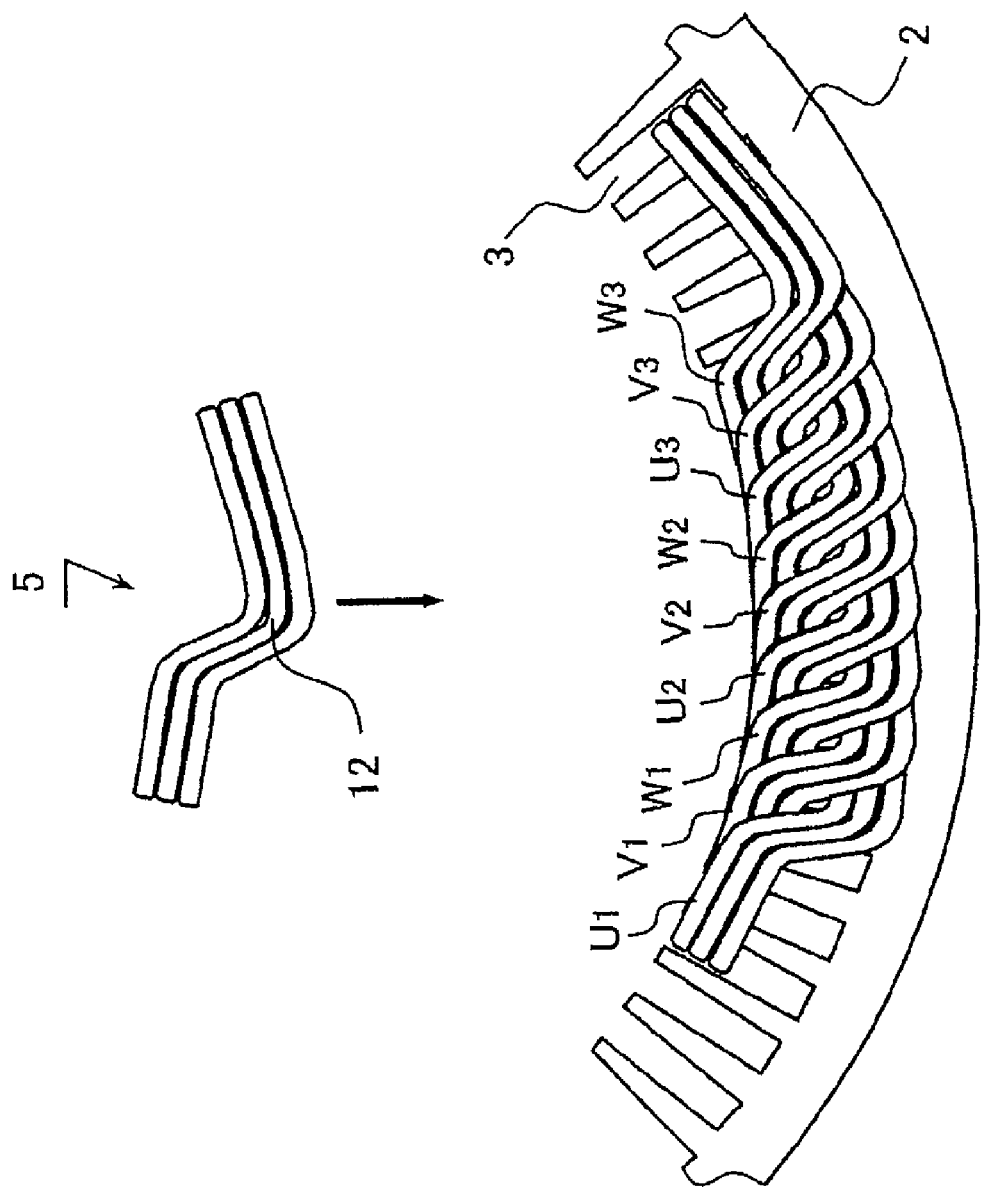
FIG. 7 is an oblique view of a state in which the formed coil being the first embodiment of the present invention is fitted into a stator slot.

FIG. 7 is a top plan view of the formed coil 5 seen from the crown 12 in a state of being fitted into the stator slot 3 of the stator core 2. For ease of explanation, the case is shown, in which the number of formed coils 5 is nine pieces. The rotary electric machine of the present invention is of a three phase coil, and comprises coils of a U phase, a V phase and a W phase. Reference symbols of U, V, and W described in the figure show the U phase, the V phase, and the W phase, respectively, and subsequent figures show the number of the formed coil 5 allotted to the each phase. The formed coil 5 of the same shape is disposed in sequence of U1, V1, W1, U2, V2, W2, . . . , and is fitted into the stator core 2. The actual number of formed coils 5 in the present invention is 24 pieces for each phase and a total of 72 pieces, and as shown in FIG. 2A, 72 pieces of the formed coil 5 are fitted into the stator core 2.

Figure 8:
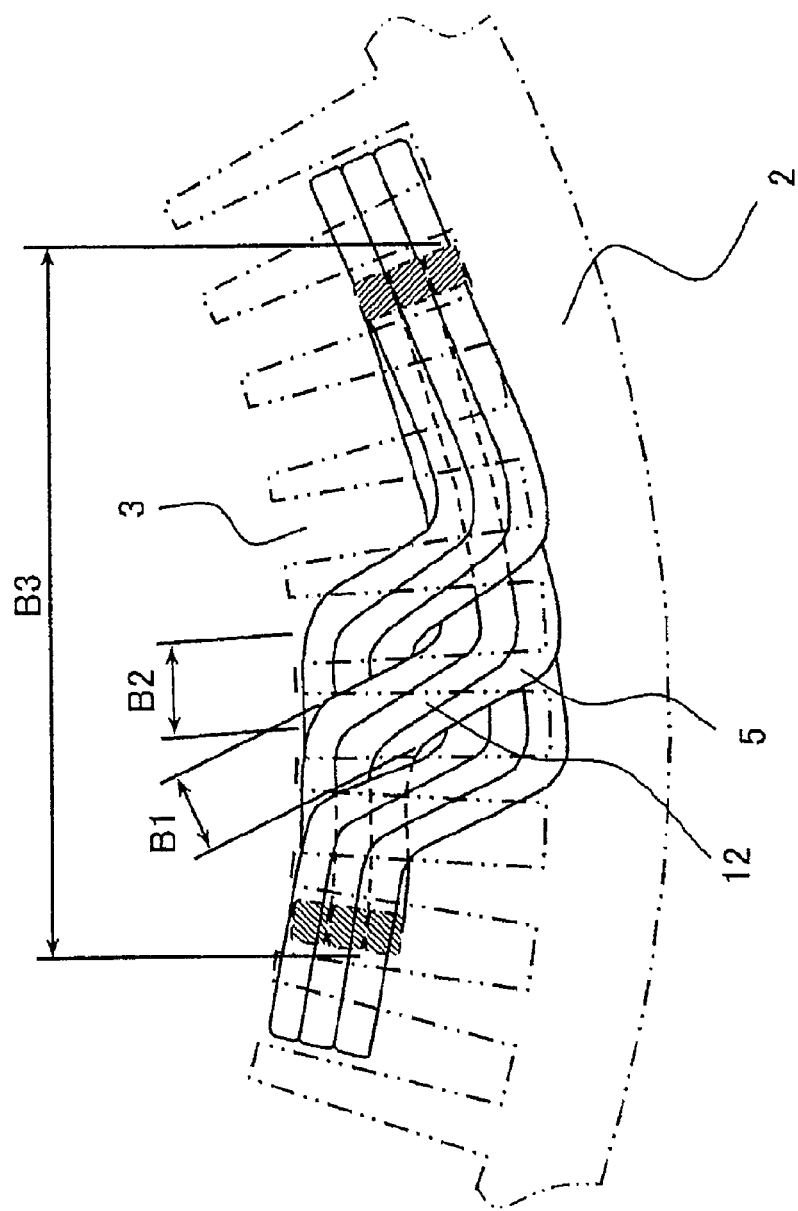
FIG. 8 is an explanatory drawing of the shape of the formed coil fitted into the stator slot being the first embodiment of the present embodiment.

FIG. 8 is a top plan view of three pieces of the formed coil 5 seen from the crown 12 in a state of being fitted into the stator slot 3 of the stator core 2. For ease of explanation, the place inside the stator slot 3 of the centermost formed coil 5 only is shown by a cross section. Further, the stator core 2 is shown by a two-dot broken line. The crown 12 is allowed to be shifted by the width size B1 of the formed coil 5, and is formed in a crank shape within the range of the interval B2 of the adjacent stator slots 3. As a result, fitting the formed coil 5 of the same shape into each stator slot 3 of the stator core 2 is realized.

When the formed coil 5 is formed by shifting larger than the width size B1, the whole size B3 of the formed coil 5 becomes large, so that the formed coil 5 does not enter the predetermined stator slot 3. Further, when the formed coil 5 is formed by shifting smaller than the width size B1, the whole size B3 of the formed coil 5 becomes small, so that the formed coil 5 does not enter the predetermined stator slot 3 likewise. On the other hand, when the crown 12 of the formed coil 5 is formed in a crank shape outside the range of the interval B2 of the stator slot 3, a plurality of formed coils 5 abuts against each other and does not enter the stator slot 3.

Figure 9:
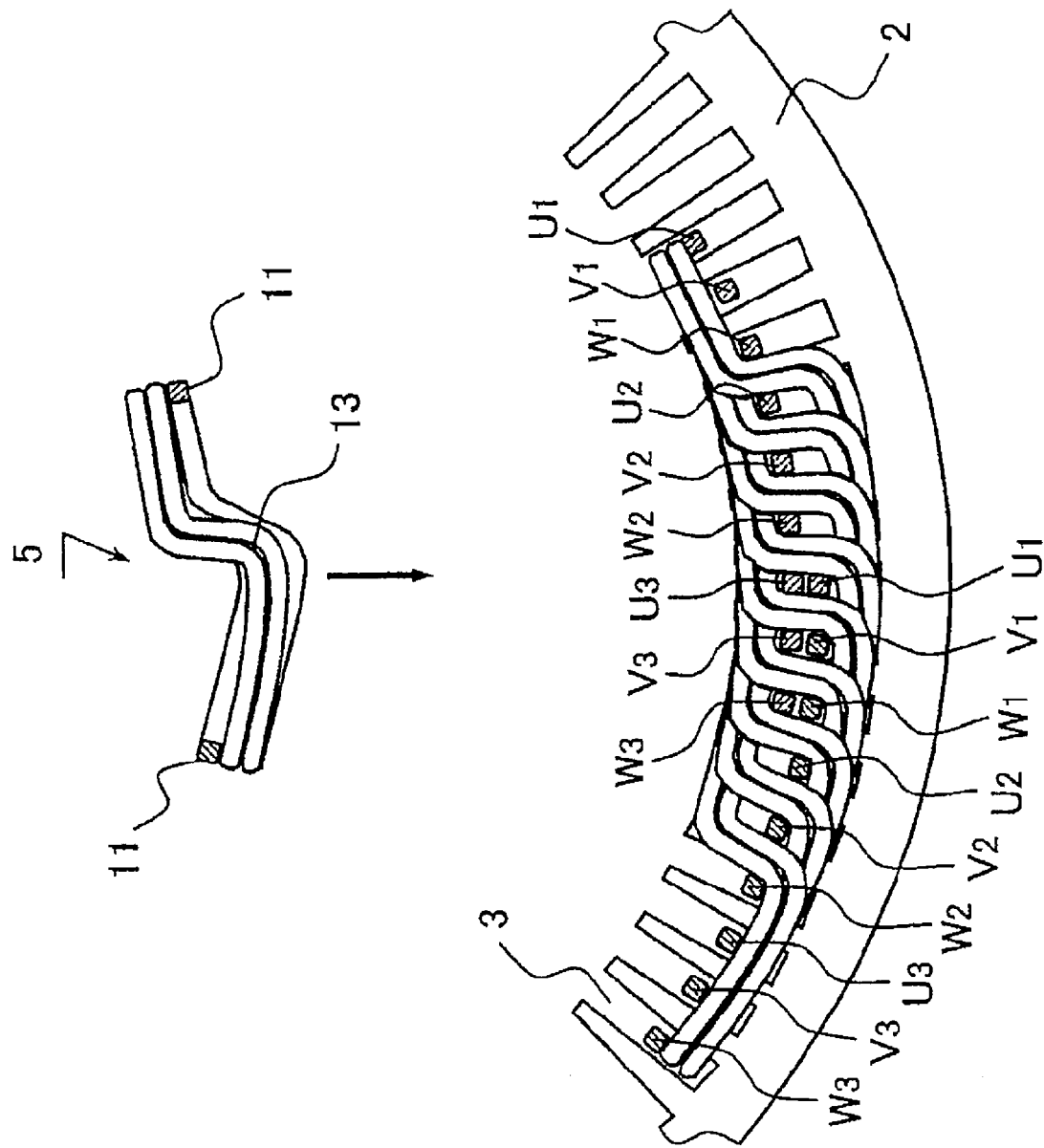
FIG. 9 is a top plan view of the formed coil being the first embodiment of the present invention seen from a terminal portion side in a state of being fitted inside the stator slot.

FIG. 9 shows a top plan view of the formed coil 5 seen from the terminal portion side crown 13 side in a state of being fitted into the stator slot 3 of the stator core 2. For ease of explanation, the case is shown, in which the number of formed coils 5 is nine pieces. Reference symbols of the formed coils 5 allotted in FIG. 7 to each phase of the U phase, the V phase, and the W phase are shown in the terminal portions 11. The terminal portions 11 are disposed such that U1 and U3 are adjacent to each other within the same stator slot, and further, within the adjacent stator slot, V1 and V3 are adjacent to each other, and further, within the adjacent stator slot, W1 and W3 are adjacent to each other. In this manner, within the same slot, the formed coils 5 of the same phase are formed to be fitted.

Figure 10:
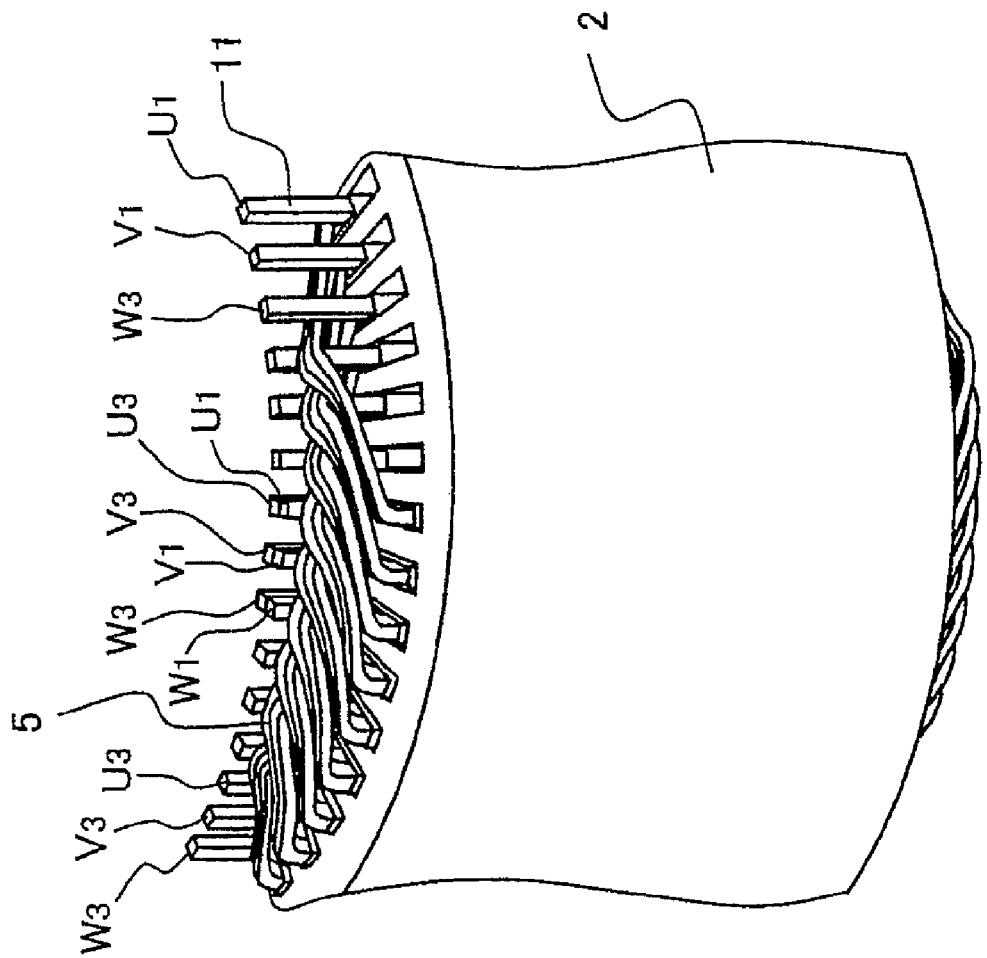
FIG. 10 is an oblique view of a state in which the formed coil being the first embodiment of the present invention is fitted to the stator and connected to the terminal portion.

FIG. 10 shows an oblique view of a state in which the formed coil 5 is fitted into the stator core 2 and is connected to the terminal portion 11. For ease of explanation, the case is shown, in which the number of formed coils 5 is nine pieces. Further, reference symbols of the formed coils 5 allotted in FIG. 7 to each phase of the U phase, the V phase, and the W phase are shown in the terminal portions 11. The U1 and the U3 of the terminal portion 11 are connected by welding, so that the continuous U phase coil is formed. Further, the V1 and the V3 are also connected by welding, so that the continuous V phase coil is formed. Further, the W1 and the W3 are also connected by welding, so that the continuous W phase coil is formed.

Figure 11:
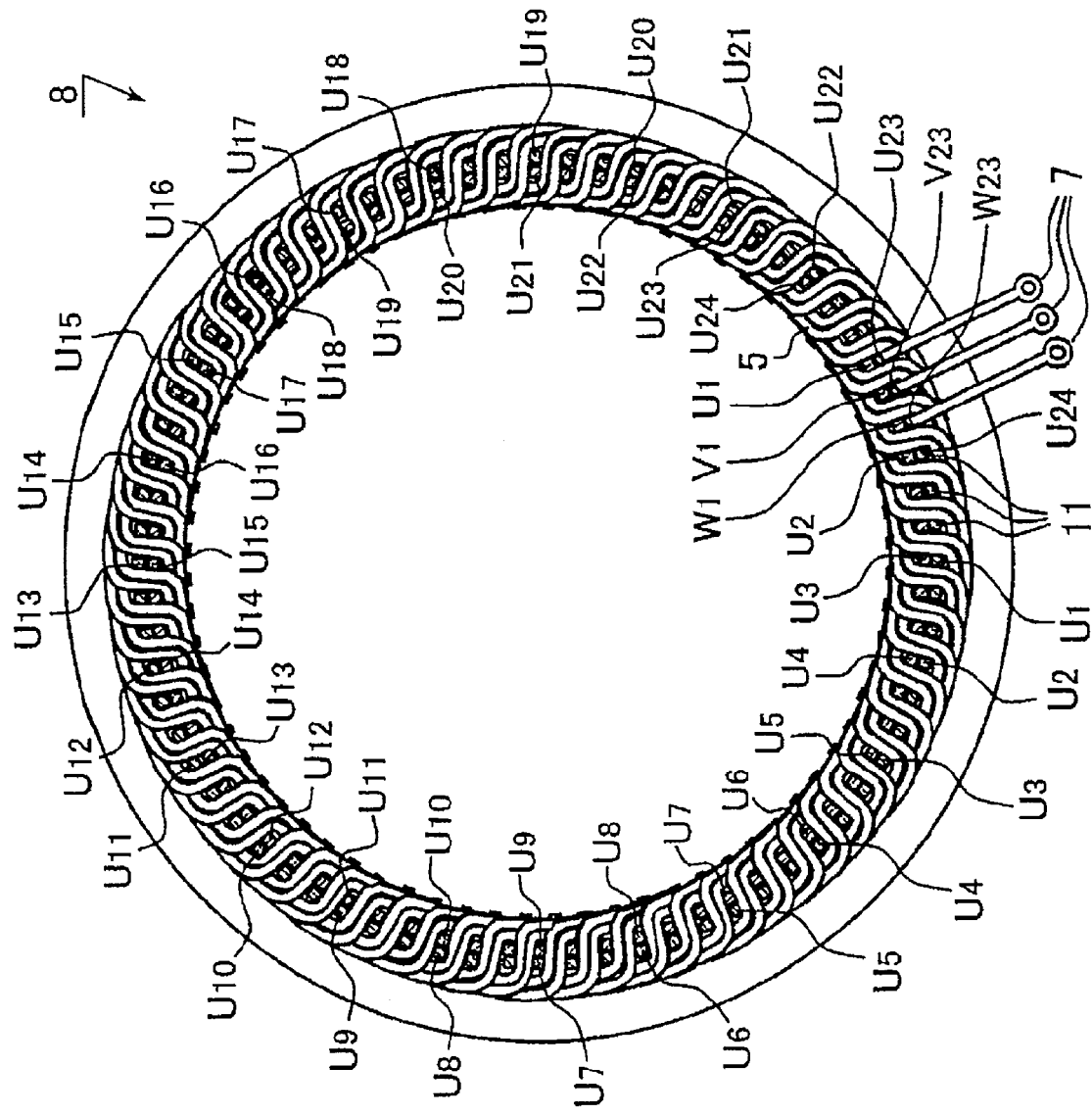
FIG. 11 is a top plan view of the distribution winding stator being the first embodiment of the present invention seen from the terminal portion side.

FIG. 11 shows a top plan view of a state in which the formed coil 5 is fitted into the stator core 2 and is connected to the terminal portion 11 seen from the terminal portion side 11. The U phase only is described with the number of the formed coil 5 allotted from 1 to 24. Further, the V phase and the W phase are described with the number of the formed coil 5 allotted from 1 to 23. The U1 and the U3 of the terminal portion 11 are connected by welding, so that the coil of the continuous U phase is formed.

The U1 and the U3 of the terminal portion 11 are connected by welding, and subsequently, going around the U2 and the U4, the U3 and the U5 in subsequence up to the U23 and the U1, and the U24 and the U2, all the coils are connected by welding, thereby forming the continuous U phase coil. Although not illustrated, the V phase and the W phase go around the likewise, and are connected by welding. Further, the U23 of the terminal portion 11 is connected with copper lead wires 7 by welding. Further, the V23 and the W23 are likewise connected with the lead wires 7 by welding, and the distribution winding stator 8 in which the U phase, the V phase, and the W phase are connected to the lead wires 7 respectively is obtained.

Second Embodiment

Figure 12:
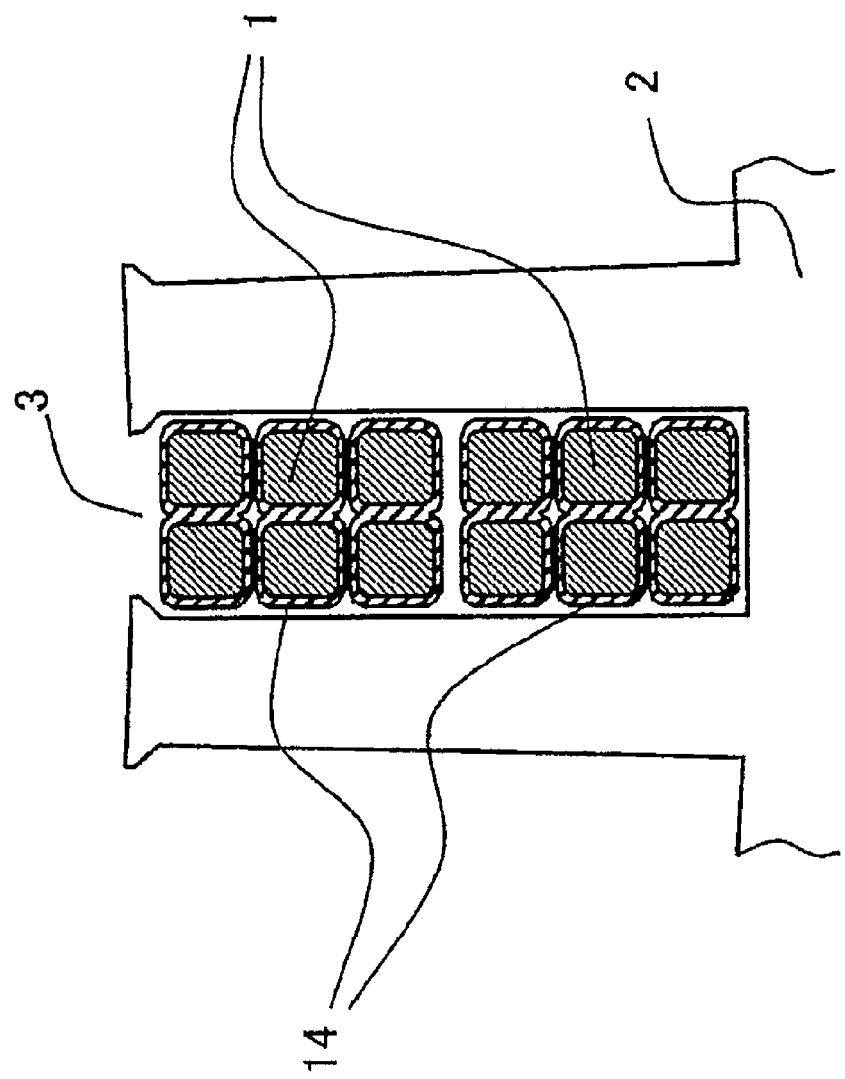
FIG. 12 is a cross-sectional view inside the slot of the distribution winding stator being a second embodiment of the present invention.

FIG. 12 shows a cross-sectional view of a portion of the stator slot 3 in a state in which a formed coil is formed by a square wire 1 coated with a fusion bond 14 of a second embodiment of the present invention and is fitted into a stator core 2. Two pieces of the square wire 1 are adhered to roughly make one piece of the square wire, thereby forming a formed coil. The fusion bond 14 is fused by heating at the predetermined temperature. Two pieces of the square wire 1 are overlapped and given heating and cooling, so that they can be adhered to each other. This achieves a structure in which 12 pieces of the square wire 1 are disposed within one slot. As a result, the flux density is further increased and the current density is reduced, thereby increasing efficiency as the rotary electric machine.

What is claimed is:

1. A rotary electric machine, wherein a winding coil formed with a crank-shaped portion without being accompanied with twisting on rough crown portions of both ends in the rotary electric machine, the rotary electric machine comprising:
   a stator winding including a winding coil created from a conductive wire having a rectangular cross-section and an insulating coated layer, the conductive wire being wound multiple times to form a coil shape, and the winding coil being partially disposed inside a slot of a stator;
   wherein the crank-shaped portion of the winding coil is formed by shifting a portion of a crown of the winding coil, that has a width size of a broad surface, to a different direction along the broad surface of the winding coil; and
   wherein width size concerns a broad surface of plural pieces of the winding coil, the broad surface being disposed perpendicular to the superposed side surfaces of the conductive wires that form the winding coil.

2. The rotary electric machine according to claim 1, wherein the crank shape portion of the winding coil is formed by deforming an edgewise surface of the rectangular conductive wire.

3. The rotary electric machine according to claim 1, wherein the crank shape portion of the winding coil is formed to be smaller than or equal to an interval between slots formed in a stator.

4. A crank-shaped continuous winding coil, wherein a conductive wire of a rectangular shape in cross-section and having an insulating coated layer is wound for plural times by superposing both side surfaces of the conductive wire corresponding to the rectangular shape, and broad surfaces in width size corresponding to plural pieces of the conductive wires vertical to the superposed side surfaces are formed, and comprises:
   a winding coil formed in parallel with a part of the broad surface;
   terminal portions of both ends of the winding coil extending on the straight line in parallel in the same direction as the parallel direction in the broad surfaces of both sides of the winding coil; and
   a crank shape formed by shifting a position by a width size of the broad surface along the broad surface without being accompanied with twisting on rough crowns of both ends of the winding coil,
   wherein the crank shape is formed by shifting a position by a width size of the broad surface along the broad surface without being accompanied with twisting, so that the terminal portions of the both ends are disposed to approach the width direction by the shift of the position of the crank shape.

5. A distribution winding stator of a rotary electric machine, wherein a conductive wire of a rectangular shape in cross-section having an insulating coated layer is wound for plural times by superposing both side surfaces of the conductive wire corresponding to the rectangular shape, and broad surfaces in width size corresponding to plural pieces of the conductive wires vertical to the superposed side surfaces are formed, and comprises:
   a winding coil formed in parallel with a part of the broad surface;
   terminal portions of both ends of the winding coil extending on the straight line in parallel in the same direction as the parallel direction in the broad surfaces at both sides of the winding coil; and
   a crank shape formed by shifting a position by the width size of the broad surface along the broad surface without being accompanied with twisting on rough crowns of both ends of the winding coil,
   wherein the crank shape is formed by shifting a position by a width size of the broad surface along the broad surface without being accompanied with twisting, so that, in a state in which the continuous winding coils of the crank shape where the terminal portions of the both ends are disposed so as to approach the width direction by the shift of the position of the crank shape are inserted into a plurality of stator slots of the stator core of the rotary electric machine, the crank shape of the continuous winding coil is disposed by striding over the stator slot, and at the same time, one of the broad surfaces formed in parallel by shifting a position by the width of the broad surface along the broad surface is disposed at the innermost side of the stator slot, and the other broad surface formed in parallel is disposed at the entry side of the stator slot, and the terminal portions of both ends of the coil extended in parallel of the different winding coil inserted into different stator slot are disposed close to a center portion between the innermost side and the entry side of the stator slot and are electrically connected.

6. The rotary electric machine according to claim 1, wherein the stator winding comprises a plurality of winding coils, wherein each winding coil is directly or indirectly connected to one of a plurality of lead wires, and wherein each lead wire conveys electrical phase signals different from the electrical phase signals conveyed by other lead wires.

7. The rotary electric machine according to claim 1, further comprising:
an insulating sheet that covers a plurality of windings of the rectangular conductive wire that have been wound into the shape of a coil, rather than covering the entire rectangular conductive wire.

8. The rotary electric machine according to claim 1,
wherein the winding coil is formed with a crown portion on each of both ends of the winding coil, with each crown portion including a crank shape; and
wherein the crank shape is formed in a crown portion by deforming the crown portion to create a plurality of bends in the crown portion that projects outside of the slots of the stator.

9. The crank-shaped continuous winding coil of claim 4,
wherein the winding coil includes a conductive wire wound a plurality of times into the shape of a coil, and is formed with a crown portion on each of both ends of the winding coil, with each crown portion including a crank shape; and
wherein the crank shape is formed in a crown portion by deforming the crown portion to create a plurality of bends in the crown portion that projects outside of the slots of the stator.

10. The distribution winding stator of a rotary electric machine of claim 5,
wherein the winding coil includes a conductive wire wound a plurality of times into the shape of a coil, and is formed with a crown portion on each of both ends of the winding coil, with each crown portion including a crank-shape; and
wherein the crank shape is formed in a crown portion by deforming the crown portion to create a plurality of bends in the crown portion that projects outside of the slots of the stator.

11. The rotary electric machine according to claim 8, wherein the crank shape has a first portion aligned in the circumferential direction along the inner circumference of the stator, a second portion aligned in the circumferential direction along the outer circumferential of the stator, and a third portion that connects the first portion to the second portion.

12. The crank-shaped continuous winding coil of claim 9, wherein the crank shape has a first portion aligned in the circumferential direction along the inner circumference of the stator, a second portion aligned in the circumferential direction along the outer circumferential of the stator, and a third portion that connects the first portion to the second portion.

13. The distribution winding stator of a rotary electric machine of claim 10, wherein the crank shape has a first portion aligned in the circumferential direction along the inner circumference of the stator, a second portion aligned in the circumferential direction along the outer circumferential of the stator, and a third portion that connects the first portion to the second portion.

14. A rotary electric machine, wherein a conductive wire of a rectangular shape and having an insulating coated layer wound for plural times by superposing both side surfaces of the conductive wire corresponding to the rectangular shape, and broad surfaces in which width size corresponding to plural pieces of the conductive wires vertical to the superposed side surfaces comprising a multiple stator winding configured by storing inside a slot of the stator, and comprises:
a winding coil formed in parallel with a part of the broad surface;
terminal portions of both ends of the winding coil extending on the straight line in parallel in the same direction as the parallel direction in the broad surfaces of both sides of the winding coil; and
a crank shape formed by shifting a portion by a width size of the broad surface along the broad surface without being accompanied with twisting on rough crowns of ends of the winding coil,
wherein the terminal portions of the both ends are disposed to approach the width direction by the shift of the portion of the crank shape.

15. A rotary electric machine, wherein a conductive wire of a rectangular shape in cross-section having an insulating coated layer is wound for plural times by superposing both side surfaces of the conductive wire corresponding to the rectangular shape, and broad surfaces in width size corresponding to plural pieces of the conductive wires vertical to the superposed side surfaces comprising a multiple stator winding configured by storing inside a slot of the stator, and comprises:
a winding coil formed in parallel with a part of the broad surface;
terminal portions of both ends of the winding coil extending on the straight line in parallel in the same direction as the parallel direction in the broad surfaces of both sides of the winding coil; and
a crank shape formed by shifting a portion by a width size of the broad surface along the broad surface without being accompanied with twisting on rough crowns of ends of the winding coil,
wherein the crank shape is formed by shifting a position by a width size of the broad surface along the broad surface without being accompanied with twisting, so that, in a state in which the continuous winding coils of the crank shape where the terminal portions of the both ends are disposed so as to approach the width direction by the shift of the position of the crank shape are inserted into a plurality of stator slots of the stator core of the rotary electric machine, the crank shape of the continuous winding coil is disposed by striding over the stator slot, and at the same time, one of the broad surfaces formed in parallel by shifting a position by the width of the broad surface along the broad surface is disposed at the innermost side of the stator slot, and the other broad surface formed in parallel is disposed at the entry side of the stator slot, and the terminal portions of both ends of the coil extended in parallel of the different winding coil inserted into different stator slot are disposed close to a center portion between the innermost side and the entry side of the stator slot and are electrically connected.

* * * * *